April 10, 1928.  E. J. BLISS  1,666,040
FOOT MEASURING DEVICE FOR FITTING SHOES
Filed April 8, 1920  2 Sheets-Sheet 1
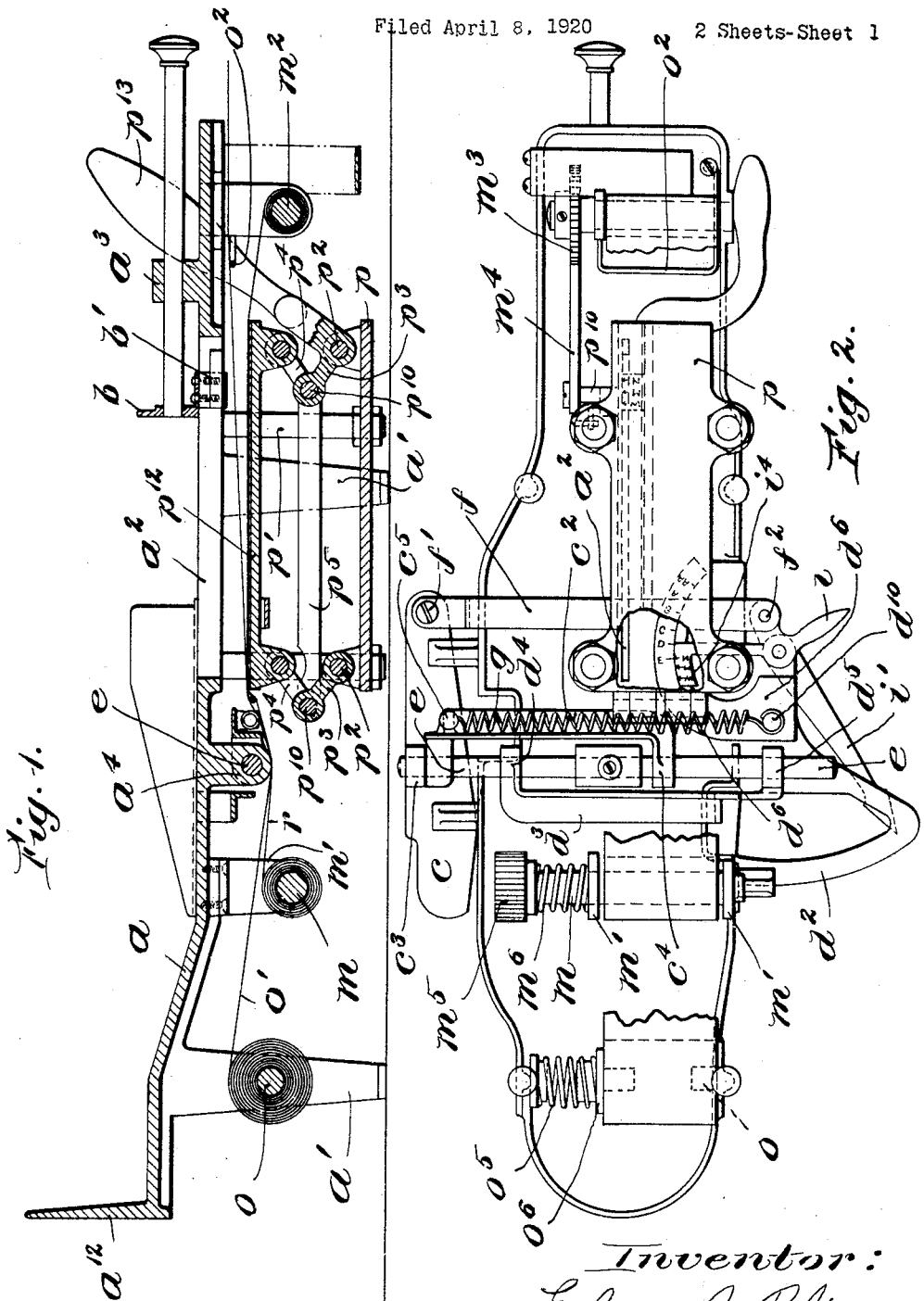
Inventor:
Elmer J. Bliss
by Geo. N. Goddard atty.

April 10, 1928.
E. J. BLISS
1,666,040
FOOT MEASURING DEVICE FOR FITTING SHOES
Filed April 8, 1920
2 Sheets-Sheet 2
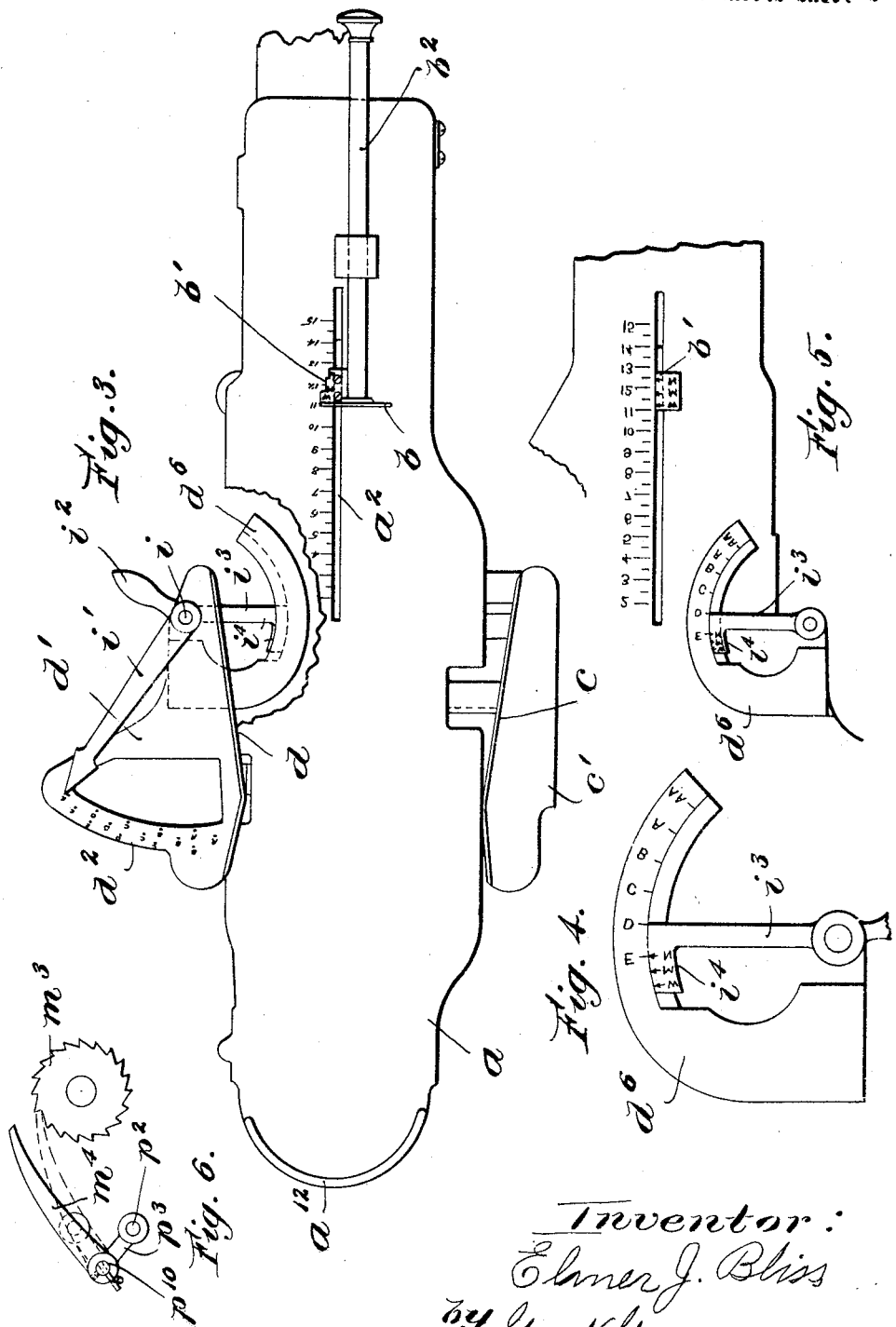
Inventor:
Elmer J. Bliss
by Geo. N. Goddard atty.

Patented Apr. 10, 1928.

1,666,040

UNITED STATES PATENT OFFICE.

ELMER J. BLISS, OF BOSTON, MASSACHUSETTS, ASSIGNOR TO REGAL SHOE COMPANY, OF WHITMAN, MASSACHUSETTS, A CORPORATION OF MASSACHUSETTS.

FOOT-MEASURING DEVICE FOR FITTING SHOES.

Application filed April 8, 1920. Serial No. 372,147.

This invention relates to the art of fitting shoes to the human foot and is intended to provide a simple, convenient and reliable device for readily ascertaining and recording the proper length size and the proper width size of the shoe required to properly fit the foot that is being measured, and is in the nature of an improvement on the shoe fitting device set forth in my Patent 1,426,143, dated October 15, 1922. It is well known that the human foot when supporting the weight of the body expands both in length and width and that feet of different types will spread or expand in different ratios. I have therefore designed the present device with particular reference to securing proper length and width measurements of the foot while the foot is supporting the weight of the body.

The present invention embodies two different methods of reading the sizes indicated by the different gaging members. By one method the index portion or member of the gaging members travels along a visible scale on the machine to act as an index or pointer to indicate on said scale the sizes of the shoe called for. At the same time provision is made for recording or registering these measurements by means of a stamping or printing device which impresses or prints upon a slip of paper the impression of the measuring scale and of its corresponding index so that a printed record may be made of each measurement taken.

In general the invention comprises a foot supporting base having a heel rest or guide at its rear end and having an adjustable toe gage movable along a longitudinal scale with an index to point out or indicate the length size of the foot being measured. At the same time opposite side members forming width gages which move independently into contact with the opposite sides of the foot mechanism are provided by which, no matter how unequal the movements of the two side gages may be, the total width of the space separating them in their different positions of adjustment is accurately indicated on a width indicating scale by a suitable index member.

These and other features of the invention will be particularly described in the following specification and will be defined in the claims hereto annexed.

In the accompanying drawings I have illustrated a convenient construction and arrangement embodying the principles of this invention in which:

Figure 1 is a longitudinal elevation in central section showing the working parts of the invention.

Figure 2 is a bottom plan view of the device.

Figure 3 is a top plan view, the base member being partly broken away.

Figure 4 is a detail view in bottom plan of the width indicating scale and register which prints the record on the record strip.

Figure 5 is a bottom plan view showing the relation of the printing section indexes for indicating both length and width sizes.

Fig. 6 is a detail of Fig. 2.

In the practice of my invention according to the form illustrated in the drawings I provide a suitable base member $a$ in the form of a platform with a raised heel portion and upwardly extending heel rest or gage $a^{12}$ for positioning the heel. This is mounted on legs $a'$ to afford space beneath for the working parts. The base at its forward end has a longitudinally perforated lug $a^3$ and at its middle portion a depending lug $a^4$ which is transversely bored to receive and supporting rod which carries and guides the side gages. The forward portion of the base is provided with a longitudinal slot $a^2$ extending down about midway of the two sides to allow the index block or member $b'$ to extend down through the slot in position to imprint itself on the record slip as will be presently described. A toe plate or gage $b$ is secured to the adjusting rod $b^2$ so as to be movable into contact with the tip of the great toe.

As shown in Figure 3 the upper face of the base member is marked off with a length scale adjacent to the longitudinal slot $a^2$ so as to indicate the length of the required shoe by reading this scale in connection with the index block $b'$ which has three offset portions marked W M and N to indicate the readings that should be taken when fitting for a wide, a medium or a narrow toe shoe.

For gaging the width I provide two side gaging members $c$ and $d$ comprising upright plates formed integrally respectively with the supporting plates $c'$ and $d'$ which are approximately horizontal. It is desired that these two side gages should move into contact with the adjacent side of the interposed foot so as to properly perform their gaging actions, and as the foot is asymmetrical I have provided that each shall have its own movement independent of the other.

The plate $d'$ supporting the gaging member $d$ is shown as having a general triangular shape and provided with a width scale arm $d^2$. On its under side the plate $d'$ is connected with the transverse bracket $d^3$ having two offset lugs $d^4$ $d^5$ with aligning apertures to fit over a supporting guide rod $e$ which is inserted in the bore of the lug $a^4$ and is held there by a set screw. This permits the side gage $d$ to move freely transversely of the device.

In a similar manner the plate $c'$ carrying the gaging member $c$ of which it forms part is united with an underneath bracket $c^2$ having offset lugs $c^3$ $c^4$ which are bored in alignment to fit over the supporting guide rod $e$ so that the gage member $c$ may also have free sliding movement transversely of the device. A spring $g$ connecting a pin $c^5$ on the underside of one gage with a corresponding pin $d^{10}$ on the underside of the other side gage member serves to yieldingly draw the two side gages laterally toward each other.

As shown in Figure 3 there is mounted in the plate $d'$ a vertical rock shaft $i$ to which is secured an index or pointer $i'$ and a handle $i^2$ the pointer being arranged to travel along the scale marked on the scale arm $d^2$. A connecting link $f$ has pivotal connection at $f'$ and $f^2$ respectively with the side gage $c$ and a short arm of the pointer $i'$. It will be apparent that if the gage $c$ is moved toward the gage $d$ while the latter remains stationary the pointer will be swung around its pivotal center over the scale arm $d^2$ in one direction while the reverse movement of the gage $c$ tends to swing the pointer in the other direction. It is clear that the movement away from the center of the gage member $d$ tends to swing the pointer in one direction while the opposite movement tends to swing it in the opposite direction. If both gages move apart simultaneously the total separation will be indicated by the pointer. Whether they move equally or unequally therefore whatever the position of each side gage with reference to the middle line of the device the pointer will always indicate the exact extent of separation and therefore will accurately indicate on a properly marked scale the width of the foot being measured. As shown in Figure 3 the scale arm may be marked with a plurality of scales for indicating measurements for men's shoes, women's shoes or children's shoes the units of measurement of which are different.

When the foot is placed on the platform of the base $a$ with the heel resting against the heel rest $a^2$ the toe gage $b$ is then set to light contact with the tip of the great toe and the proper index on the length scale is read off according to the toe style of the shoe for which the foot is being measured, that is, a narrow pointed toe will call for a longer length size than will a medium toe or a broad toe. Hence the notches on the index plate $b'$.

In order to record accurately the size measurements I have located beneath the platform of the base suitable printing and recording mechanism by which the sizes as ascertained by the contact gages are printed or stamped on a strip of paper.

At the rear end of the machine between the legs $a'$ is mounted a stud or shaft $o$ for supporting a narrow roll $o'$ of paper or suitable material to be printed or stamped. Beneath this tape or paper strip $o'$ is mounted a ribbon shaft $m$ in suitable supporting brackets $m'$ and both the ribbon and the paper tape are carried forward above a movable platen $p^{12}$ which is operated to press the inking ribbon $r$ and the tape $o'$ upward against suitable index letters or insignia as will be presently described.

On the under side of the index plate $b'$, as shown in Figure 5, are formed raised insignia which in this case comprise the letters W M and N, and alongside the slot $a^2$ on the under face of the base platform is formed a raised scale which are in effect fixed type against which the paper and the inking ribbon are firmly pressed by the upwardly moving platen $p^{12}$. Obviously as the index member $b'$ is movable longitudinally in the slot $a^2$ alongside this raised scale, and as it is provided on its under face with the raised index insignia or letters, these letters will be printed on the strip at the same time that the whole raised scale along the underside of the platform is printed thereon, and they therefore afford an indication in the manner already explained of the proper length of the shoe to fit the foot being measured according to the style of the toe thereof.

In a similar manner the width indicating scale with its movable index is impressed or printed on the paper strip or tape as will now be explained.

The laterally movable plate $d'$ is provided on its under side with a scale arm $d^6$ the lower face of which is provided with width indicating letters that are raised or in relief in relation to the under face of said arm to position so that the raising of the platen $p^{12}$ presses the inking ribbon and the paper strip upward against the scale so as to print on the paper a complete impression of the whole scale. On the lower end of the short vertical rock-shaft $i$ of the pointer or indicating mechanism is secured an index arm $i^3$ carrying an index member $i^4$ which preferably has three index marks designated by letters W M and N to enable one to select proper width measurement according to the style of the toe of the shoe to be tried on whether wide, medium or narrow since, as will be understood, a shoe of the narrow or pointed toe type should be of greater length than a medium or broad toe shoe. The raised letters W M and N as well as the raised letters on the scale arm $d^6$ lie in the same horizontal plane with the raised length scale numbers on the bottom of the base $a$. As index characters on member $i^4$ will be printed opposite the appropriate part of the width scale, an inspection of the printed strip will show what size of shoe is indicated to fit the foot to be measured according to the toe style selected.

The mechanism for printing the length and width measurements on the record strip or tape $o$ may be of any suitable construction and arrangement. In the drawings I have shown a supporting plate or member $p$ suspended some distance below the platform of the base $a$ by means of vertical rods $p'$. At the opposite ends of this plate $p$ are formed lugs to receive front and rear rock-shafts $p^2$ on which are mounted toggle levers $p^3$ pivotally connected with toggle levers $p^4$ by means of the shafts $p^{10}$ at their lower ends and having pivotal connection at their upper ends with the depending lugs formed at opposite ends of the platen $p^{12}$. The front and rear rock-shafts forming the pivotal connection between the upper and lower toggle levers are connected by a connecting link $p^5$ which ensures equal and parallel movement of the two sets of toggles so that the platen will be raised always in a horizontal position with the printing sections on the bottom of the base platform and the side gaging member.

The rock-shaft $p^2$ is actuated by a curved hand lever $p^{13}$. The forward shaft $p^{10}$ forming the pivotal connection between the toggle elements carries a pivoted pawl $m^4$ which normally engages a ratchet $m^3$ on the ribbon winding shaft $m^2$ as shown in Figures 2 and 6. It will be perceived that on each swing of the lever $p^{13}$ the pawl which has engagement with the teeth of the ratchet $m^3$ will give a slight movement to said ratchet and to the shaft $m^2$ so as to cause a slight forward feeding movement of the ribbon to continually shift it to present a new surface to the printing dies. The downward movement of the lever $p^{13}$ tends to strain the toggles and press the platen upward against the underside of the foot supporting platform simultaneously printing thereon the length scale and its multiple index and the width scale and its multiple index so as to print upon the strip the full representation of both scales of both indexes as shown in Figure 6 thereby forming a permanent and easily read record of the appropriate size measurements of the shoe to fit the foot being measured.

A wire bail $o^2$ mounted immediately below the forward end of the foot platform serves to pinch the tape against the platform so as to keep it in raised position and after each measurement the tape is pulled out by hand for a sufficient distance to include the printed measurements thereon and is then torn off which operation may be repeated with each measurement.

For re-winding the inking or printing ribbon I provide the shaft $m$ with a mill head member $m^5$ and interposed coiled spring $m^6$ so as to exert frictional pressure between the head $m^5$ and one of the depending arms $m'$ which support the shaft so as to produce a tension that will keep the printing ribbon taut while in use while permitting the ribbon to be wound back upon the spindle or shaft $m$ after it has been entirely unwound therefrom and wound up on the shaft or spindle $m^2$.

In a similar manner a tension spring $o^5$ is pressed against the stud $o^6$ which projects into the tubular space inside the roll of paper in order to removably support the same and by its frictional tension retards the unwinding of the paper strip so as to keep it taut and free from wrinkles.

It will therefore be seen that provision is made for reading the proper measurement scales which are visible from above and for printing on a paper strip corresponding measurements from raised scales and index members beneath the level of the foot platform.

What I claim is:

1. A foot measuring device provided with a width size scale embracing in its construction a foot supporting base, a length indicating gage member movable longitudinally thereof and side gaging members laterally movable thereof, the said gaging members being provided with index members arranged to travel along appropriate measuring scales and means for imprinting said index members and scales on a strip of paper or the like to indicate thereon the length size and width size of the interposed foot being measured, substantially as described.

2. A foot measuring device provided with a width size scale embracing in its construction a base for supporting the foot and independently movable side-gaging members arranged to form gaging contact with the foot, a width indicating index movable along the width scale in correspondence with the width of the space separating the side gaging members, and means for imprinting on a recording strip the impression of the width scale and its relatively movable index to record the width measurement of the proper size of shoe, substantially as described.

3. A foot measuring device provided with a width size scale embracing in its construction a foot supporting base, and laterally and independently movable side gaging members arranged to contact with opposite sides of the interposed foot, an index movable along the width scale according to the distance separating the gages, means for supporting a recording strip and an inking ribbon in opposition to said scale and index, and a platen movable into position to imprint the scale and index upon the recording strip, substantially as described.

4. A foot measuring device embracing in its construction a foot supporting base provided on its underside with a series of raised figures comprising a length scale, a toe gage movable longitudinally of said base to gage the length of the foot thereon, an index member connected with said toe gage to move therewith along said scale, and means for imprinting upon a recording strip the impressions of said scale and of said index in order to reproduce on the strip markings showing the location of the index in relation to said scale, substantially as described.

5. A foot measuring device provided with length and width size scales embracing in its construction a foot supporting base, a longitudinally movable toe gage provided with an index member arranged to be moved along a length-size scale on the base, independently movable side gages one of which carries the width scale, and an index member movable along said scale to indicate the width of the interposed foot, a movable platen arranged to press an interposed inking ribbon and a recording tape against both scales and both index members to print on the recording strip the scales and their index members in size indicating relation thereto, substantially as described.

6. A foot measuring device provided with length and width size scales embracing in its construction a foot supporting base and movable toe and side gages for indicating the length and width of the foot on co-ordinated size scales, means for pressing an inking ribbon and a paper strip against said scales and the indicating portion of said gages to print a size indicating record on said strip, and means for automatically shifting the inking ribbon to expose different portions thereof in position to print, substantially as described.

7. A foot measuring device provided with length and width size scales embracing in its construction a foot supporting base and movable gaging members mounted thereon, index members connected with the gages to move along appropriately arranged size scales, a platen arranged to press an interposed inking ribbon and a paper strip against said index members and scales, means for operating said platen and ribbon, shifting means interconnected therewith, substantially as described.

8. In a foot measuring device provided with length and width-size scales, the combination of a foot-supporting base, movable width-gaging members mounted thereon in position to form gaging contact with the foot, an index member movable along the width-size scale, said index member being provided with plural index characters to indicate, in connection with the scale, the particular width-size measurement appropriate to different styles of shoe, and means for imprinting said scale on a sheet in conjunction with the properly located index, substantially as described.

9. In a foot measuring and size-recording device, the combination with foot-gaging members arranged in correlation with size-indicating means embracing a size scale and pointer serving to indicate a size measurement of an inserted foot, of means for producing an imprint of the scale and pointer while in their size-indicating relation.

10. In a foot measuring and recording device, the combination with size-indicating means whose size-indicating readings are determined by movable foot-gaging members in engagement with an inserted foot, and means for imprinting on a recording medium the size-indicating readings from the size-indicating means while in their size indicating positions.

In witness whereof, I have subscribed the above specification.

ELMER J. BLISS.